United States Patent
Sugawara

(10) Patent No.: US 7,426,275 B2
(45) Date of Patent: *Sep. 16, 2008

(54) HANDLING DEVICE AND METHOD OF SECURITY DATA

(75) Inventor: Takehito Sugawara, Miyagi-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 831 days.

This patent is subject to a terminal disclaimer.

(21) Appl. No.: 10/687,311

(22) Filed: Oct. 16, 2003

(65) Prior Publication Data

US 2004/0083374 A1   Apr. 29, 2004

(30) Foreign Application Priority Data

Oct. 16, 2002   (JP)   ............................. 2002-301948

(51) Int. Cl.
*H04L 9/00*   (2006.01)
*H04B 1/00*   (2006.01)
(52) U.S. Cl. ..................... 380/264; 380/262; 340/5.64
(58) Field of Classification Search ................. 380/264, 380/262; 340/5.62–5.64
See application file for complete search history.

(56) References Cited

U.S. PATENT DOCUMENTS

| | | | |
|---|---|---|---|
| 5,392,356 A | 2/1995 | Konmo et al. | |
| 5,610,574 A | 3/1997 | Mutoh et al. | |
| 5,679,984 A * | 10/1997 | Talbot et al. | ............... 307/10.3 |
| 5,774,550 A * | 6/1998 | Brinkmeyer et al. | ........ 713/168 |
| 5,787,367 A * | 7/1998 | Berra | ............................. 701/1 |
| 6,043,752 A | 3/2000 | Hisada et al. | |
| 6,384,711 B1 | 5/2002 | Cregger et al. | |

FOREIGN PATENT DOCUMENTS

| | | |
|---|---|---|
| EP | 0 663 650 | 12/1994 |
| EP | 0 903 271 | 3/1999 |
| EP | 1 098 472 | 11/2000 |
| WO | WO 95/17739 | 6/1995 |

* cited by examiner

*Primary Examiner*—Pramila Parthasarathy
(74) *Attorney, Agent, or Firm*—Brinks Hofer Gilson & Lione

(57) ABSTRACT

A handling device of security data of a vehicle includes: an in-vehicle unit having a portable unit authenticating unit, an EEPROM, a ROM, and a controller; a vehicle having the in-vehicle unit, a door locking mechanism, and a communication unit; and a portable unit for locking or unlocking the door locking mechanism of the vehicle. In the above device, an encryption unit for encrypting the security data with a cipher key is interposed between the controller and the EEPROM, the security data is encrypted with the cipher key and stored into the EEPROM, according to the instruction from the controller based on the authentication result of the portable unit authenticating unit, and the cipher key is stored into the ROM.

7 Claims, 3 Drawing Sheets

HANDLING DEVICE AND METHOD OF SECURITY DATA

BACKGROUND OF THE INVENTION

1. Field of the Invention

The present invention relates to a technique for handing security data such as an ID code and a cipher key in remote keyless entry (RKE), when automatically locking or unlocking the door of a vehicle according to communication with a portable unit.

2. Description of the Related Art

FIG. 3 shows a block structure of remote keyless entry (RKE) and a method of handling the security data such as an ID code and a cipher key. In FIG. 3, a vehicle 1 has a door locking mechanism 5 and a detector 4 for detecting open/close of a door. Further, an in-vehicle unit 2 is set within the vehicle 1. In the in-vehicle unit 2, a portable unit authenticating unit 6 authenticates the ID of the portable unit after receiving a door locked signal or a door unlocked signal from the portable unit 20 through a portable unit receiving/transmitting antenna 3, and as a result of the authentication, when the ID is authenticated, a general controller 7 controls the door locking mechanism so as to lock or unlock the door. Here, an EEPROM 9 stores the ID (vehicle ID and portable unit ID) and the cipher key (the portable unit communicates with the vehicle through a signal encrypted by the cipher key) and a ROM 8 stores a program for general control.

Hitherto, as the remote keyless entry (RKE) for locking or unlocking the door locking mechanism of a vehicle, there are known a manual RKE that is in one-way communication from a portable unit to an in-vehicle unit as well as a passive RKE that is in two-way communication between a portable unit and an in-vehicle unit. This passive RKE is to lock or unlock the door of a vehicle automatically and perform two-way communication between a portable unit a user carries and an in-vehicle unit set in the vehicles. As a result of the recognition of the portable unit ID and the in-vehicle ID, when the in-vehicle unit authenticates the portable unit, it performs the locking or unlocking operation on the door locking mechanism 5. Each of the portable unit and the in-vehicle unit has a unique ID (Identification Code) and cipher key (Key) in order to authenticate with each other, and at a communication time, they communicate with each other through a signal obtained by encrypting the data including the ID with the cipher key.

In description of the concrete function of the passive RKE, the in-vehicle unit 2 transmits a request signal at regular intervals. The request signal, including the in-vehicle ID, can be received at only a short distance. When the portable unit 20 is out of the reach of a request signal, it cannot receive the request signal. While, when a person carrying the portable unit approaches the vehicle, coming into the reach of a request signal, the portable unit receives the request signal, checks the in-vehicle ID included in the request signal, and sends a response signal to the vehicle after confirming that it has been issued from the correct in-vehicle unit.

The in-vehicle unit receives the response signal, takes out the portable unit ID included therein, and compares it with the portable unit ID registered in a memory. In the case of agreement, it issues an unlocking signal to the door locking mechanism 5, to unlock (release) the door, while in the case of disagreement, it does not issue any control signal to the locking mechanism. When a user carrying the portable unit gets off the vehicle and goes far away, the in-vehicle unit issues a locking signal to the door locking mechanism at the point when the portable unit is not in a position to receive a request signal, namely, at the point when the in-vehicle unit is not in a position to receive a response signal.

A request signal and a response signal are encrypted with the cipher key stored by the portable unit and the in-vehicle unit in common and issued, and a receiving party decodes the signal with the cipher key stored in the receiving party.

Since the security data such as the ID and the cipher key should be kept in a memory even if a battery is removed, it is stored in a nonvolatile memory such as an EEPROM or a ROM. The data stored into the EEPROM or the ROM indicates the information value in the form of the original data. Especially, in the in-vehicle unit, it is stored in the EEPROM not in the ROM, because of the peculiar situation of the portable unit ID. This peculiar situation is that the portable unit ID is not initially stored in the in-vehicle, but that the in-vehicle unit, receiving a response signal from some portable unit (one vehicle includes a plurality of portable units having various IDs), analyzes the signal, takes out the portable unit ID previously stored in the same portable unit, and stores it into the self nonvolatile memory of the in-vehicle unit.

Since a car dealer and a user can do this work at any time, it is not necessary to make a match (pairing) of a portable unit and an in-vehicle unit in a manufacturing facility advantageously. However, since the ID will be registered afterward as mentioned above, ROM cannot be used as the storing medium. Further, through a signal transmitted from one to the other in the in-vehicle unit and the portable unit, the cipher key will be also registered in the other afterward (although FIG. 3 doesn't show a memory in the portable unit, the portable unit has a memory), and therefore, it will be stored in the EEPROM not in the ROM.

SUMMARY OF THE INVENTION

In the above-mentioned conventional technique, while use of a ROM as a nonvolatile memory prevents others from decoding the stored contents of the ROM easily, it takes a lot of time and trouble to decode the information. On the contrary, generally, it is comparatively easy to analyze the stored contents of the EEPROM. Accordingly, when the data of the portable ID and the cipher key stored in the EEPROM is decoded by others and its rule is analyzed by others, the security of many cars having similar cipher keys may be compromised. Using conventional techniques, there has been a problem from the viewpoint of the security of a car because the security data such as the ID and the cipher key is stored in the EEPROM as it is with no change of value.

An object of the invention is to prevent others from decoding the security data, even if reading the data, by encrypting the security data to be stored in the EEPROM and/or the ROM that is a nonvolatile memory before storing the above.

In order to solve the above problem, the invention adopts the following structure.

A handling device of security data comprises: an in-vehicle unit having a portable unit authenticating unit, a nonvolatile memory, and a controller; a vehicle having the in-vehicle unit, an in-vehicle system, and a communication unit; and a portable unit for giving a control instruction to the in-vehicle system of the vehicle through communication with the communication unit, in which device an encryption unit for encrypting the security data of the vehicle with a cipher key is interposed between the controller and the nonvolatile memory of the in-vehicle unit, and the security data is encrypted with the cipher key and stored into the nonvolatile memory according to the instruction from the controller. Further, a handling method of security data of a vehicle provided with the in-vehicle unit having the portable unit authenticating unit, the nonvolatile memory, and the controller, the vehicle having the in-vehicle unit, a door locking mechanism, and the communication unit, and the portable unit for locking or unlocking the door locking mechanism of the vehicle through communication with the communication unit, comprises a step of encrypting the security data with a cipher key in an encryption unit provided between the controller and the nonvolatile memory of the in-vehicle unit, and a step of storing the encrypted signal into the nonvolatile memory and storing the cipher key into another nonvolatile memory than the above nonvolatile memory. According to the handling device or method of the security data, since the security data is stored in the nonvolatile memory in the form of the signal encrypted with the cipher key, there is no fear that the security data of the vehicle may be decoded by others.

In the handling device of security data, the cipher key is stored in another nonvolatile memory than the nonvolatile memory storing the encrypted signal of the security data. In the handling device of security data, the security data includes a portable unit ID, the nonvolatile memory is an EEPROM, and the other nonvolatile memory is a ROM. According to the above structure, since the cipher key is kept in the nonvolatile memory such as the ROM whose data is difficult to decode, in handing the security data such as the portable unit ID, there is no fear that the cipher key may be read out by others.

DESCRIPTION OF THE PREFERRED EMBODIMENT

Figure 1:
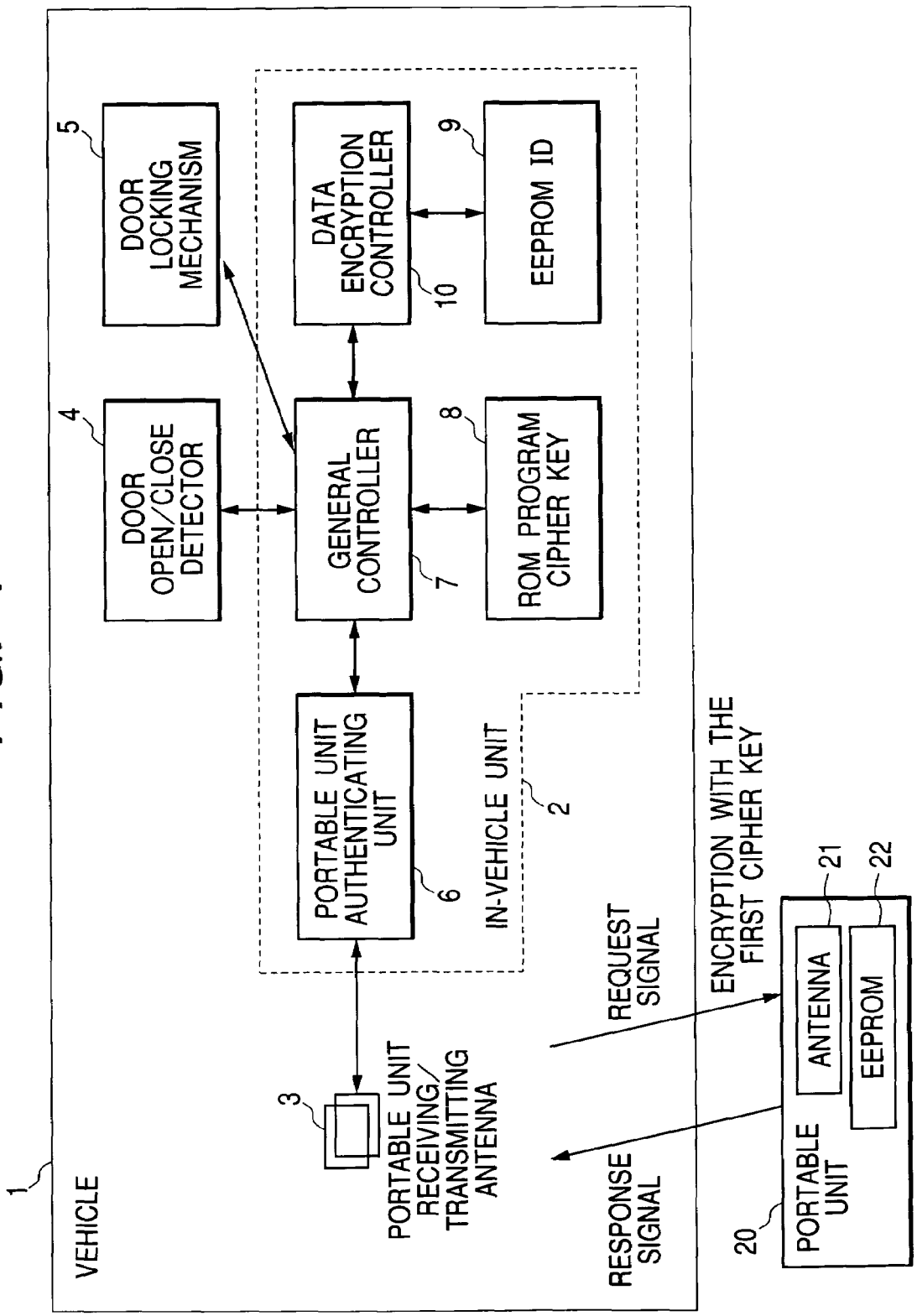
FIG. 1 is a block diagram showing a system of handling the security data such as an ID code and a cipher key in remote keyless entry, according to an embodiment of the invention.
Figure 2:
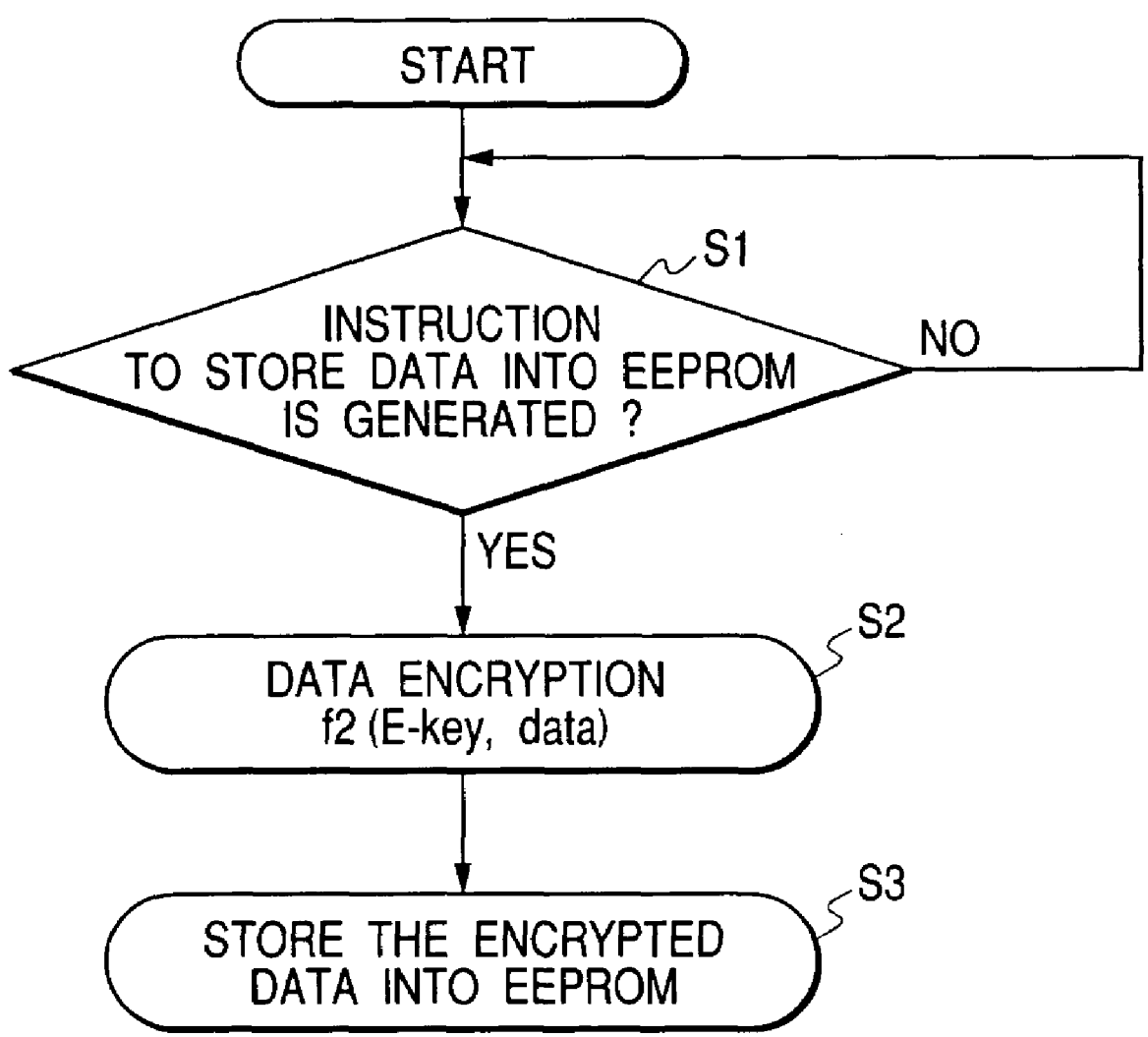
FIG. 2 is a flow chart showing the flow of storing the security data into the EEPROM, according to the embodiment.
Figure 3:
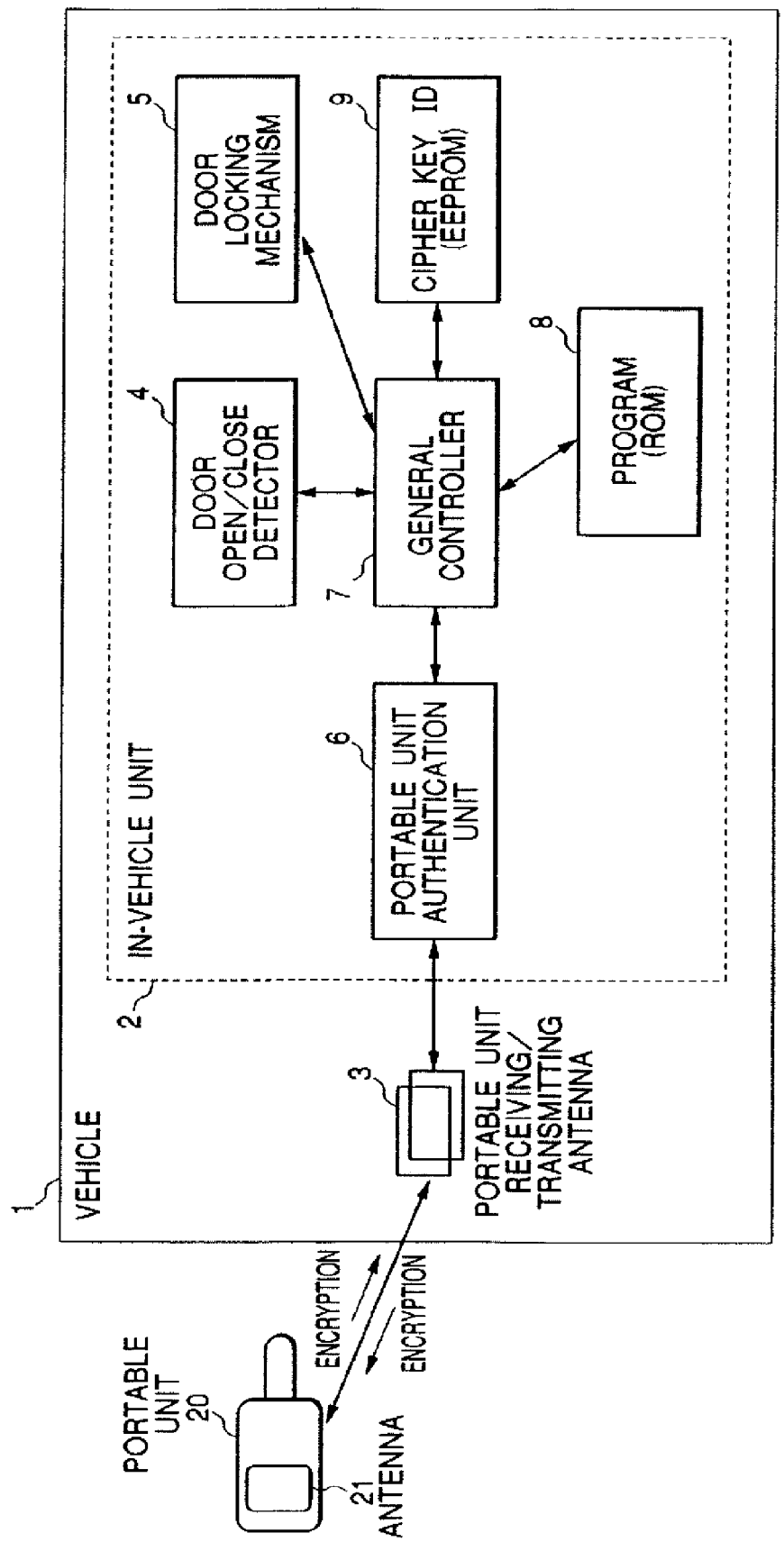
FIG. 3 shows a block structure of remote keyless entry and a method of handling the security data such as an ID code and a cipher key, according to the conventional technique.

A device and a method of handling the security data according to an embodiment of the invention will be described with reference to FIG. 1 and FIG. 2. FIG. 1 is a block diagram showing a handling system of the security data such as an ID code and a cipher key in remote keyless entry, according to the embodiment of the invention, and FIG. 2 is a view showing a flow of storing the security data into the EEPROM, according to the embodiment.

In the drawings, the reference numeral 1 designates a vehicle, 2 designates an in-vehicle unit, 3 designates a portable unit receiving/transmitting antenna, 4 designates a door open/close detector, 5 designates a door locking mechanism (in-vehicle system), 6 designates a portable unit authenticating unit, 7 designates a general controller, 8 designates a ROM, 9 designates an EEPROM (Electrically Erasable Programmable Read-Only Memory), 10 designates a data encryption controller, 20 designates a portable unit, 21 designates an antenna of portable unit, and 22 designates an EEPROM within the portable unit.

In FIG. 1, the vehicle 1 and the portable unit 20 form passive keyless entry which automatically locks or unlocks a door through two-way communication between the in-vehicle unit 2 and the portable unit 20 with assured management and security of the vehicle. Namely, when the portable unit 20 is in the reach of a request signal from the in-vehicle unit 2, the portable unit 20 issues a response signal upon receipt of the request signal, while the in-vehicle unit 2 releases (unlocks) the door lock as a result of the ID check upon receipt of the response signal. Further, when the portable unit 20 is moved far away from the vehicle 1, the in-vehicle unit 2 gives the door locking mechanism 5 an operation to lock the door when it is not in a position to receive a response signal from the portable unit 20.

More specifically, the in-vehicle unit 2 transmits a request signal including the in-vehicle unit ID to the portable unit 20 through the antenna 3 at regular intervals, while the portable unit 20 transmits a response signal including the portable unit ID to the in-vehicle unit 2 through the antenna 21, in a manner of the two-way communication. The portable unit authenticating unit 6 of the in-vehicle unit 2 compares the portable unit ID included in the response signal from the portable unit 20 with the portable unit ID previously stored in the EEPROM 9. In the case of agreement, the general controller 7 releases the door lock by issuing an unlocking signal to the door locking mechanism 5, while in the case of disagreement, the general controller 7 never issues the unlocking signal to the door locking mechanism 5 and never releases the door lock.

The request signal from the in-vehicle unit 2 and the response signal from the portable unit 20 are encrypted with a first cipher key stored in both the portable unit and the in-vehicle unit and issued, and in a receiving party, the request signal or the response signal is decoded with the first cipher key stored in the receiving party.

In use of the remote keyless entry (RKE), the portable unit ID included in a response signal is newly registered in the in-vehicle unit by setting the in-vehicle unit at the ID register mode to analyze a response signal issued by the portable unit 20, take out the corresponding portable unit ID, and store it in the EEPROM 9. In short, a prescribed portable unit ID is not previously stored in the in-vehicle unit 2, but the portable ID of a portable unit is learned and stored. Thus, a portable unit ID is stored before use of the RKE, rather then simultaneously with completion of the manufacture of an in-vehicle unit. Therefore, the portable unit ID is stored in a nonvolatile memory, not in a ROM but in an EEPROM.

The EEPROM 9 of the vehicle 1 in FIG. 1 stores the in-vehicle unit ID of the corresponding vehicle other than the portable unit IDs attached to a plurality of portable units for the corresponding vehicle, as mentioned above. Each different ID may be attached to each portable unit, the same ID may be attached to the portable units, or ID different in every group may be attached.

The ID (portable unit ID and in-vehicle unit ID) stored in the EEPROM 9 is a signal encrypted with a second cipher key by the data encryption controller 10. If ID is stored in the EEPROM directly in the form of its original signal as done the conventional technique, the ID may be decoded by others because of the structure of the EEPROM, which is a serious problem from the viewpoint of security of the vehicle. According to the invention, since ID is encrypted with the second cipher key and stored in the EEPROM 9, the ID cannot be decoded even if the data is read out by others. Together with the first cipher key for a request signal and a response signal, the second cipher key is also stored in the ROM 8 whose data is difficult to decode.

FIG. 2 shows a flow of taking out the portable unit ID included in a response signal from a portable unit and storing it into the EEPROM. When an instruction to store the data (for example, the portable unit ID) into the EEPROM is issued by the general controller 7 (Step 1), the data encryption controller 10 encrypts the security data (Step 2) by using some function f2 (E-Key, data)=E-data. The f2 (x, y) is the encryption function by using the second encryption key, E-Key is the cipher key for encrypting the data to be stored into the EEPROM, data is the security data to be stored into the EEPROM, and E-data is to be obtained by encrypting the data so as to be stored into the EEPROM. Then, the encrypted data is decoded by using the function $f2^1$ (E-Key, E-data)=data. The encrypted data is stored in the EEPROM in Step 3.

As mentioned above, according to the invention, data (for example, a request signal and a response signal) used for the communication between an in-vehicle unit and a portable unit is encrypted with the first cipher key and the security data (for example, ID) to be stored in the EEPROM, not in the ROM is encrypted with the second cipher key, hence to prevent others from decoding the data. Here, the first cipher key and the second cipher key are both stored into the ROM whose data is difficult to decode.

Although the above description has been made, by way of example, in the case of storing the portable unit ID into the EEPROM 9 of the in-vehicle unit, the in-vehicle unit ID is also stored in the EEPROM 9, in addition to the portable unit ID, and this in-vehicle unit ID is also encrypted with the second cipher key. Further, the portable unit 20 may be provided with the EEPROM 22 and some controller not illustrated and the in-vehicle unit ID and the corresponding portable unit ID may be encrypted and stored in this nonvolatile memory.

Although the above description has been made, by way of example, by using the passive RKE for issuing a request signal at regular intervals, a trigger switch may be provided in a door handle, and the operation of the trigger switch may cause the transmission of a request signal. Further, although the description has been made, by way of example, in the case where the in-vehicle system is the door locking mechanism, the in-vehicle system is not restricted to this, but it may be some other device such as an engine starter. In the case of the engine starter, the trigger switch may be built in the ignition cylinder for inserting a mechanical key or it may be built as an individual switch.

According to the invention, since the security data is stored in the form of a signal encrypted with a cipher key, when storing it into a nonvolatile memory, there is no fear that the security data of a vehicle may be decoded by others.

Since the cipher key is stored in a nonvolatile memory such as a ROM whose data is difficult to decode, there is no fear that the cipher key may be read by others.

Further, also in the communication through a request signal and a response signal in the remote keyless entry, the security is assured by encrypting through two-way communication with the other cipher key, and since the other cipher key is stored in a nonvolatile memory such as a ROM whose data is difficult to decode, there is no fear that the other cipher key may be decoded by others.

What is claimed is:

1. A handling device of security data comprising:
an in-vehicle unit having a portable unit authenticating unit, a nonvolatile memory, a general controller, and a data encryption controller;
a vehicle having the in-vehicle unit, and a communication unit; and
a portable unit for giving a control instruction to the in-vehicle unit of the vehicle through communication with the communication unit, wherein a first cipher key is stored in the portable unit and the in-vehicle unit,
wherein the portable unit transmits a signal encrypted with the first cipher key indicating a ID of the portable unit to the vehicle,
the communication unit receives the transmission signal,
the portable unit authenticating unit authenticates as to whether the signal is a transmission signal that is transmitted from a predetermined portable unit based on a comparison between the reception signal encrypted with the first cipher key and data indicating the ID of the portable unit stored in the nonvolatile memory or not,
the general controller causes the in-vehicle unit to perform the control instructions if the portable unit authenticating unit judges that the signal is a transmission signal that is transmitted from a predetermined portable unit,
the data encryption controller for encrypting security data of the vehicle with a second cipher key is interposed between the general controller and the nonvolatile memory of the in-vehicle unit, and
the security data is encrypted by the data encryption controller with the second cipher key and stored into the nonvolatile memory according to an instruction from the general controller when the in-vehicle unit is set into a security data register mode.

2. The handling device of security data, according to claim 1, wherein the second cipher key is stored in a ROM that is different from the nonvolatile memory storing the encrypted signal of the security data.

3. The handling device of security data, according to claim 2, wherein the security data includes a portable unit ID and the nonvolatile memory is an EEPROM.

4. The handling device of security data, according to claim 3, wherein an in-vehicle unit ID is stored in the EEPROM in addition to the portable unit ID.

5. The handling device of security data according to claim 1, wherein the data encryption controller decodes encrypted data.

6. A handling method of security data of a vehicle provided with an in-vehicle unit having a portable unit authenticating unit, a first nonvolatile memory, a general controller and a data encryption controller, a vehicle having the in-vehicle unit, a door locking mechanism, and a communication unit, and a portable unit for locking or unlocking a door locking mechanism of the vehicle through communication with the communication unit, wherein a first cipher key is stored in the portable unit and the in-vehicle unit, the method comprising:
transmitting, from the portable unit, instructions for locking/unlocking the door locking mechanism of the vehicle and a signal encrypted with the first cipher key indicating a ID of the portable unit and
receiving the signal encrypted with the first cipher key by the communication unit provided in the vehicle;
the portable unit authenticating unit authenticating as to whether the signal is a transmission signal that is transmitted from a predetermined portable unit based on a comparison between data indicating the ID of the portable unit stored in the nonvolatile memory and data indicating the ID of the portable unit contained in the signal transmitted from the portable unit or not;
the central controller provided in the in-vehicle unit causing the door lock mechanism to be locked/unlocked if the portable unit authenticating unit judges that the signal is a transmission signal that is transmitted from a predetermined portable unit;
wherein the data encryption controller for encrypting the ID of the portable unit with a second cipher key is interposed between the general controller and the nonvolatile memory of the in-vehicle unit, and
the ID of the portable unit contained in the signal transmitted from the portable unit is encrypted by the data encryption controller with the second cipher key and stored into the nonvolatile memory according to an instruction from the general controller when the transmission signal is received from the portable unit after setting the in-vehicle unit into an ID register mode.

7. The handling method of security data according to claim 6, wherein the second cipher key is stored in a ROM, which is not the aforementioned nonvolatile memory.

* * * * *